(12) United States Patent
Tsorng et al.

(10) Patent No.: US 12,725,638 B2
(45) Date of Patent: Sep. 1, 2026

(54) COUNTERWEIGHT FIXTURE

(71) Applicant: Quanta Computer Inc., Taoyuan City (TW)

(72) Inventors: Yaw-Tzorng Tsorng, Taoyuan City (TW); Ming-Lung Wang, Taoyuan City (TW); Yu-Cheng Chang, Taoyuan City (TW); Lu-Ting Chen, Taoyuan City (TW)

(73) Assignee: Quanta Computer Inc., Taoyuan City (TW)

( * ) Notice: Subject to any disclaimer, the term of this patent is extended or adjusted under 35 U.S.C. 154(b) by 252 days.

(21) Appl. No.: 18/761,056

(22) Filed: Jul. 1, 2024

(65) Prior Publication Data

US 2026/0004816 A1 Jan. 1, 2026

(51) Int. Cl.
*G11B 33/08* (2006.01)

(52) U.S. Cl.
CPC .................................... *G11B 33/08* (2013.01)

(58) Field of Classification Search
CPC ... B64D 43/02; A63B 22/0089; A63B 21/063; A63B 21/028; A63B 21/154; A63B 21/02; A63B 21/04; B66B 11/04; B66B 17/12; B66B 11/0045; B66B 1/06; B66B 11/00; G06F 3/03543; G01M 17/007; G01M 7/08; G01M 7/022; G01M 99/007; B60R 19/52; G03B 21/58; B64C 27/008; B60L 53/30; E05D 13/145; E04G 21/167; G11B 33/08; Y02P 70/50; E02F 9/18; G09B 5/02; G09B 23/28; A63H 1/30; G02B 23/165; H02K 33/16
See application file for complete search history.

(56) References Cited

U.S. PATENT DOCUMENTS 8,960,460 B2 * 2/2015 Mentink ................. B66C 23/74
212/197
2020/0195115 A1 * 6/2020 Zhang .................... H02K 33/16
2023/0015265 A1 * 1/2023 Shi ......................... H02K 33/16

* cited by examiner

*Primary Examiner* — Brandi N Hopkins
(74) *Attorney, Agent, or Firm* — Nixon Peabody LLP

(57) ABSTRACT

A counterweight fixture for simulating weight of a computing device includes at least one counterweight block, a base, and at least one magnet. The counterweight block is configured to be placed on and secured to the base. The base includes a bottom and at least one wall extending from the bottom. The bottom of the base forms at least one opening on an opposite side of the at least one wall. The at least one magnet is securely embedded in a respective one of the at least one opening of the bottom of the base.

20 Claims, 8 Drawing Sheets

COUNTERWEIGHT FIXTURE

FIELD OF THE INVENTION

The present invention relates generally to counterweight fixtures and, more specifically, to counterweight fixtures or frame assemblies used to assist in testing computing device assemblies.

BACKGROUND OF THE INVENTION

Computing devices assemblies, typically including computing devices such as servers or storage devices, often need to undergo testing relating to weight during the new product introduction stage. Since the cost of the components of the computing devices are often too expensive and time-consuming to install; in addition to having the potential to cause damage to these components, not all of the testing processes require using these components. Some testing allows the use of stacks of components such as screws, steel plates, scrap materials, etc. to simulate the true weight of the computing device assembly. This testing, however, frequently takes a lot of time to: (1) find the appropriate counterweight object; (2) determine the proper weight adjustment; and (3) properly and stably fix the counterweight at the exact position. Even if the required weight is satisfied, the simulated center of gravity is often different from the actual center of gravity, which may result in inaccurate testing results.

Thus, there is a need for a counterweight fixture or frame assembly that addresses one or more of these shortcomings.

SUMMARY OF THE INVENTION

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings and each claim.

According to one aspect of the present disclosure, a counterweight fixture for simulating weight of a computing device includes at least one counterweight block, a base, and at least one magnet. The at least one counterweight block is configured to be placed on and secured to the base. The base includes a bottom and at least one wall extending from the bottom. The bottom of the base forms at least one opening on an opposite side of the at least one wall. The at least one magnet is securely embedded in a respective one of the at least one opening of the bottom of the base.

According to a configuration of the above implementation, the at least one counterweight block is a plurality of counterweight blocks.

According to another configuration of the above implementation, the at least one counterweight block includes a plurality of extensions to assist in positioning the at least one counterweight block and the base.

According to a further configuration of the above implementation, the at least one wall of the base is a plurality of walls. Each of the plurality of walls of the base forms at least one wall positioning opening to assist in securing the at least one counterweight block and the base.

In a further aspect of the above implementation, the at least one counterweight block includes a plurality of extensions located at opposing edges to assist in positioning the at least one counterweight block and the base. Each of the plurality of extensions forms a respective block positioning opening. Each of the block positioning openings corresponds with one of the at least one wall positioning opening to assist in securing the at least one counterweight block and the base.

In a further aspect of the above implementation, a securing element is further included and extends through one of the block positioning opening and a corresponding one of the at least one wall positioning opening to assist in securing the at least one counterweight block and the base. The securing element may be a screw, pin, or plunger.

In yet a further aspect of the above implementation, the at least one magnet is a plurality of magnets.

In yet a further aspect of the above implementation, the at least one counterweight block is received within a chassis of the computing device. The chassis may be a part of a 1U server or a 2U server.

According to another aspect of the present disclosure, a frame assembly for a computing system includes a plurality of counterweight fixtures and a frame. Each of the plurality of counterweight fixtures includes at least one counterweight block, a base, and at least one magnet. The at least one counterweight block is configured to be placed on and secured to the base. The base includes a bottom and at least one wall extending from the bottom. The bottom of the base forms at least one opening on an opposite side of the at least one wall. The at least one magnet is securely embedded in a respective one of the at least one opening of the bottom of the base. The frame comprises metallic material. The at least one magnet of each of the plurality of counterweight fixtures is fixedly attached to the frame.

According to a configuration of the above implementation, the metallic material of the frame comprises steel.

According to a configuration of the above implementation, the frame is a chassis.

According to another configuration of the above implementation, The chassis may be a part of a 1U server or a 2U server.

According to a further configuration of the above implementation, the frame is a sled.

According to a further aspect of the present disclosure, a process of testing weight distribution of a computing device assembly includes providing at least one frame comprising a metallic material. A plurality of counterweight fixtures is provided. Each of the plurality of counterweight fixtures includes at least one counterweight block, a base, and at least one magnet. The at least one counterweight block is configured to be placed on and secured to the base. The base includes a bottom and at least one wall extending from the bottom. The bottom of the base forms at least one opening on an opposite side of the at least one wall. The at least one magnet is securely embedded in a respective one of the at least one opening of the bottom of the base. Each of the plurality of counterweight fixtures is attached to one of the at least one frame via the at least one magnet. Testing of the weight distribution of the computing device assembly is performed using the plurality of counterweight fixtures According to a configuration of the above implementation, the computing device assembly including a computing device, the computing device being a server or a storage device.

According to a configuration of the above implementation, the at least one frame includes a chassis.

According to another configuration of the above implementation, the at least one frame further includes at least one sled.

According to a further configuration of the above implementation, the at least one frame includes at least one sled.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of exemplary embodiments together with reference to the accompanying drawings. These drawings depict only exemplary embodiments, and are therefore not to be considered as limitations on the scope of the various embodiments or claims.

DETAILED DESCRIPTION

Figure 1:
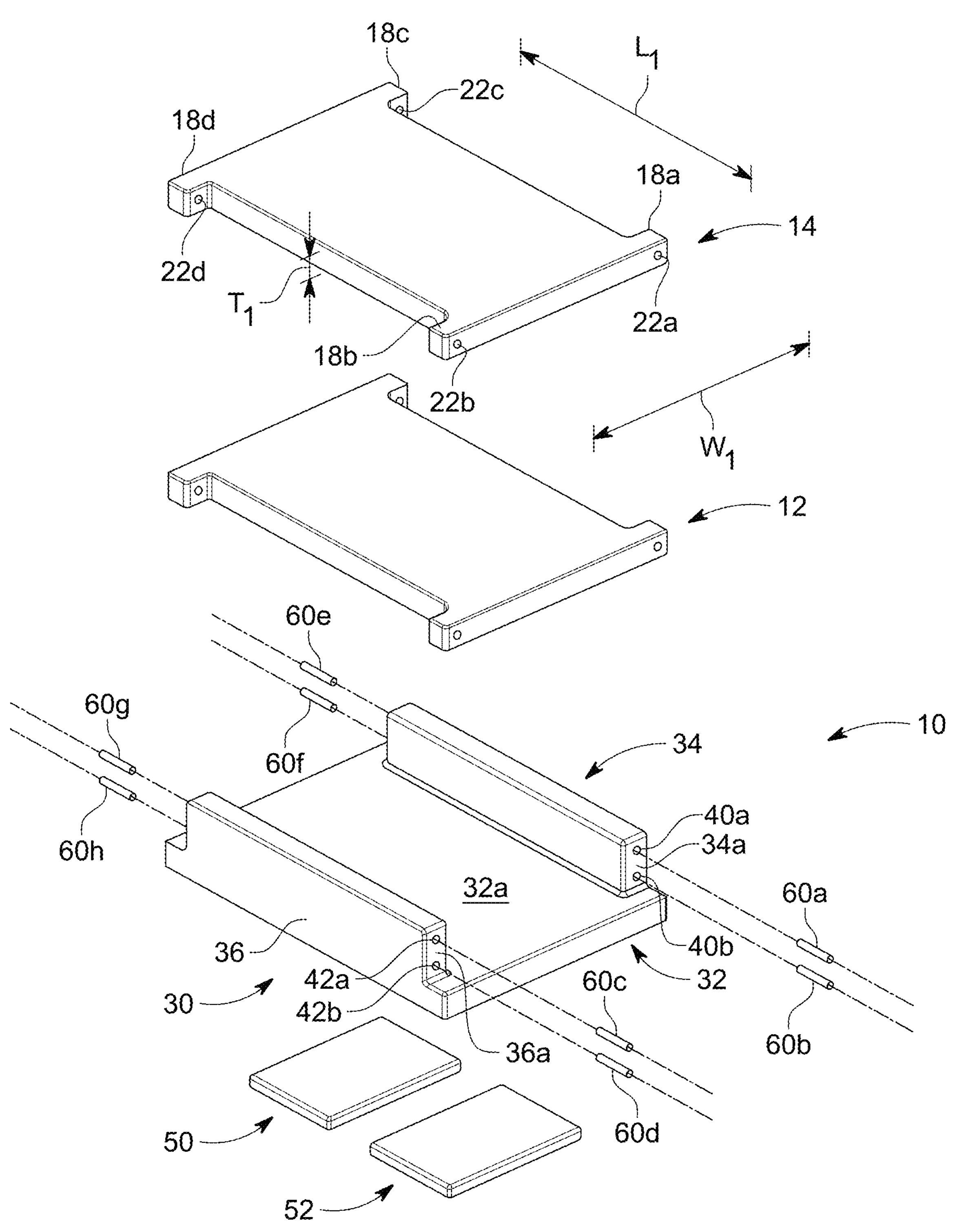
FIG. 1 is an exploded top perspective view of a counterweight fixture, according to one embodiment.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

In the present invention, a counterweight fixture includes at least one counterweight block, a base, and at least one magnet. The at least one counterweight block is configured to be placed on and secured to the base. The base includes a bottom and at least one wall extending from the bottom. The bottom of the base forms at least one opening on an opposite side of the at least one wall. The at least one magnet is securely embedded in a respective one of the at least one opening of the bottom of the base.

The counterweight fixtures of the present invention are advantageous for several reasons. The counterweight fixtures are designed to simulate the real weight distribution of the computing device assemblies when it is fully loaded. By using magnetic absorption to fix the counterweight fixture, advantages of simple operation, fast installation, and easy fixing can be accomplished. The position of the counterweight fixture may also be adjusted quickly to account for the desired load area and center of gravity for each test requirement. The counterweight fixtures may be configured to have universal specifications. This results in a more accurate simulation of a full-load computing device assembly (including, for example, a server or storage device) in, for example, the real state. The counterweight fixtures are configured and sized to be placed on a frame such as a chassis or a sled.

Referring to FIG. 1, a counterweight fixture 10 is shown in an exploded top perspective view with a plurality of counterweight blocks 12, 14, a base 30, a plurality of magnets 50, 52, and a plurality of securing elements 60*a*-60*h*. The plurality of counterweight blocks 12, 14 is configured to be located on and secured to the base 30. In one embodiment, the plurality of counterweight blocks 12, 14 are stacked on the base 30.

Figure 2A:
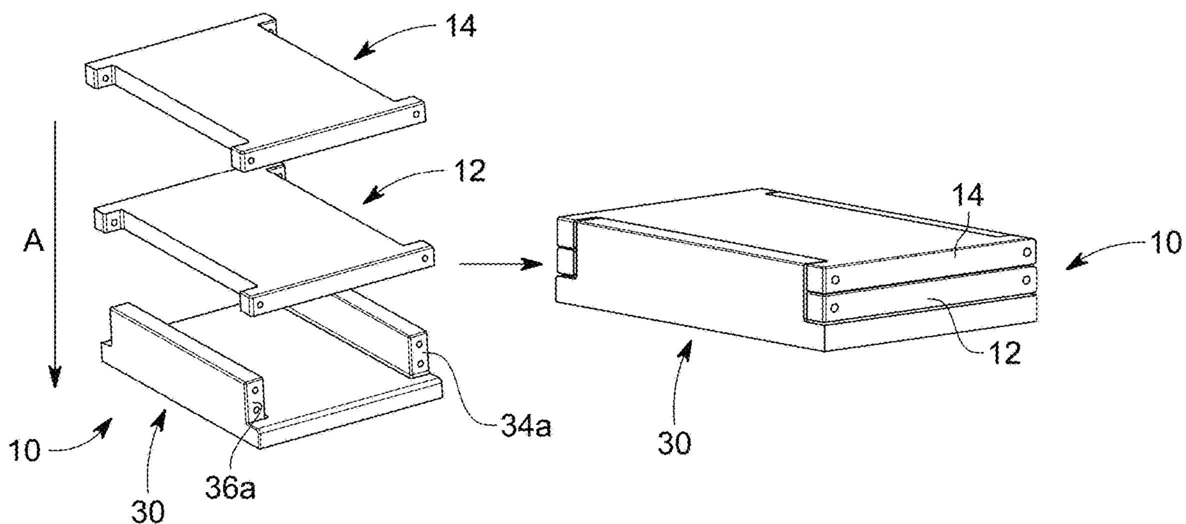
FIG. 2A is an exploded top perspective view of the counterweight fixture of FIG. 1 in the process of being assembled in one method.

The process is shown, for example, in FIG. 2A where the plurality of counterweight blocks 12, 14 are moved in the direction of arrow A, resulting in the plurality of counterweight blocks 12, 14 being located on the base 30. It is desirable for the plurality of counterweight blocks to be stacked on the base.

Figure 2B:
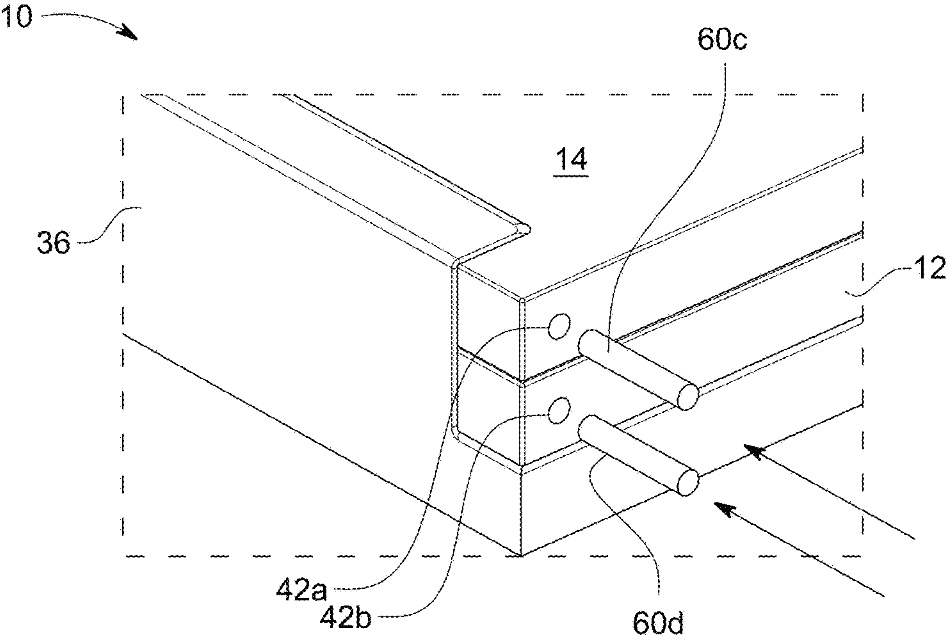
FIG. 2B is an enlarged top perspective partial view of the counterweight fixture of FIG. 1 in the process of being secured in one method.
Figure 2C:
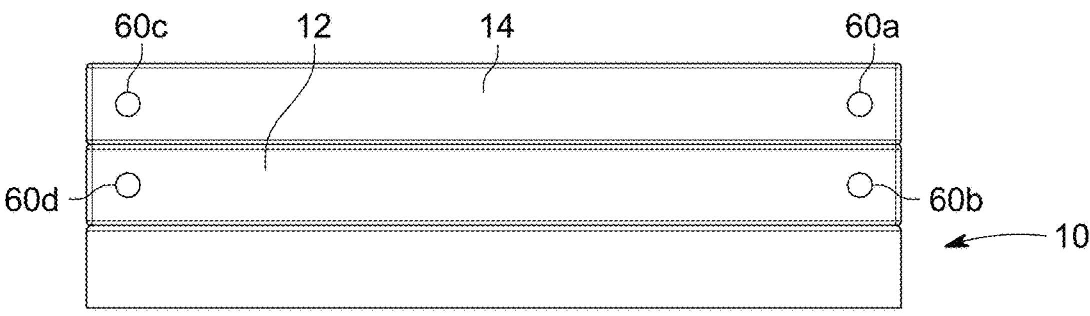
FIG. 2C is an end view of the assembled counterweight fixture of FIG. 1 after being secured in one method.
Figure 2D:
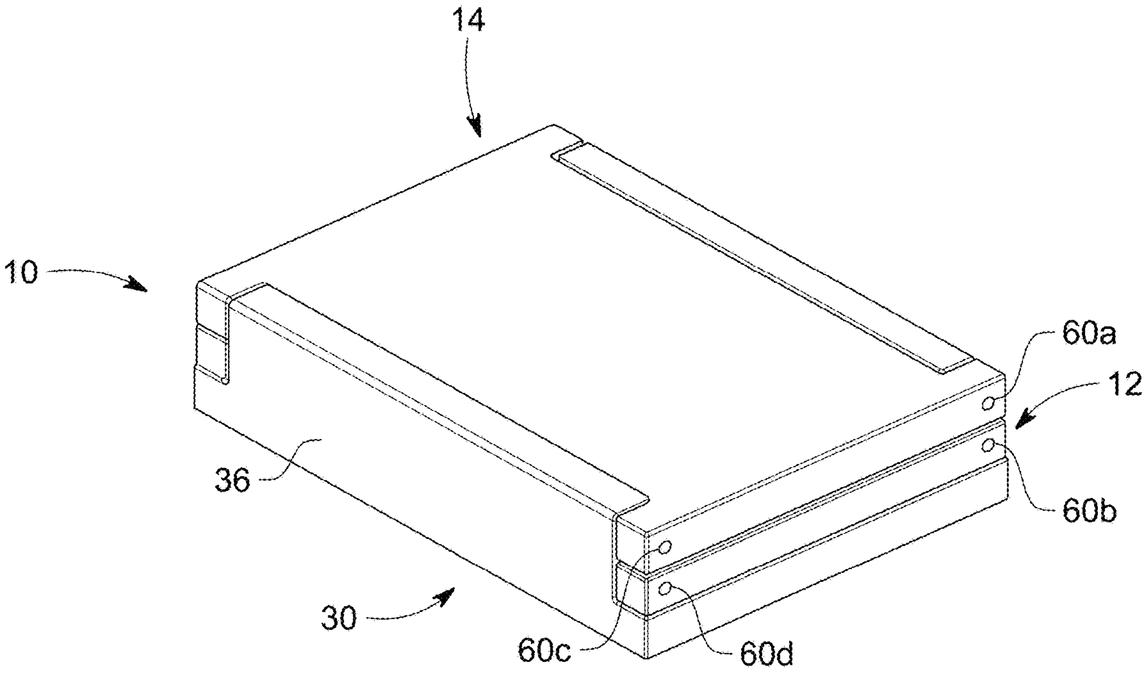
FIG. 2D is a top perspective view of the assembled counterweight fixture of FIG. 1.

After the counterweight blocks 12, 14 are positioned on the base 30, the plurality of securing elements 60*a*-60*h* assists in securing the counterweight blocks 12, 14 to the base 30. The securing elements 60*c*, 60*d* are shown in FIG. 2B in an enlarged top perspective partial view in the process of being secured to the counterweight blocks 12, 14 and the base 30. FIG. 2C shows the securing elements 60*a*-60*d* securing the counterweight blocks 12, 14 and the base 30 in an end view of the counterweight fixture 10. FIG. 2D shows the counterweight fixture 10 in an assembled position from a top perspective view.

Figure 3:
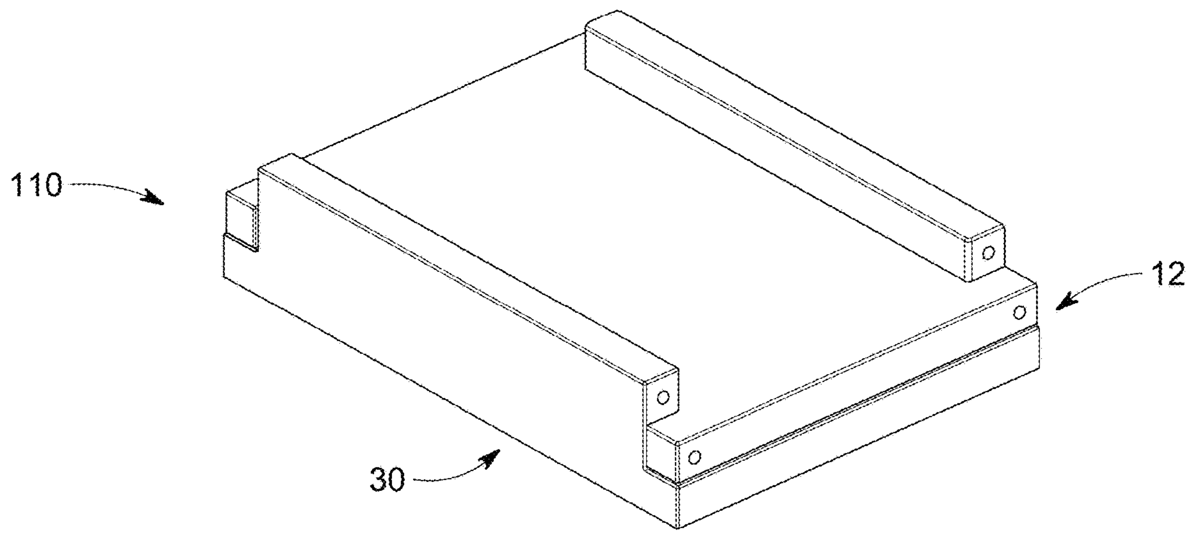
FIG. 3 is a top perspective view of an assembled counterweight fixture, according to another embodiment.

It is contemplated that the counterweight fixture has at least one counterweight block. For example, referring to FIG. 3, a counterweight fixture 110 includes one counterweight block 12 on and is secured to the base 30. The counterweight fixture 110 of FIG. 3 is in an assembled position.

Referring back to FIGS. 1, 2A, each of the counterweight blocks 12, 14 includes a plurality of extensions located at opposing edges to assist in positioning the counterweight blocks 12, 14 and the base 30. Specifically, the counterweight block 14 includes a plurality of extensions 18*a*-18*d*. The plurality of extensions 18*a*-18*d* are located on opposing ends and opposite corners from each other. Each of the plurality of extensions 18*a*-18*d* is in a general shape of a rectangle. It is contemplated that the plurality of extensions may be of different shapes and sizes, as well as the number of extensions in each counterweight block.

Each of the plurality of extensions 18*a*-18*b* includes a respective block positioning opening 22*a*-22*d* formed therein. The block positioning openings 22*a*-22*d* are shown in a non-polygonal shape and, more specifically, in the shape of a general circle or circle in FIG. 1. It is contemplated that the block positioning openings may be formed of other non-polygonal and polygonal shapes. It is contemplated that each of the plurality of extensions may include a plurality of block positioning openings formed therein.

The length, width, and thickness of the counterweight block may vary. For example, the counterweight fixtures may simulate the real weight of components such as, for example, HDDs, PCIE cards, fan module and PSU. The shape and size of the counterweight block, however, desirably correspond with the base. For example, the length L1 of the counterweight block 14 in FIG. 1 is generally from about 80 mm to about 140 mm in one embodiment. In another embodiment, the length L1 of the counterweight block 14 is from about 100 mm to about 120 mm. The width W1 of the counterweight block 14 in FIG. 1 is generally from about 60 mm to about 100 mm in one embodiment. In another embodiment, the width W1 of the counterweight block 14 is from about 70 mm to about 90 mm. The thickness T1 of the counterweight block 14 in FIG. 1 is generally from about 6 mm to about 10 mm in one embodiment. In another embodiment, the thickness T1 of the counterweight block 14 is from about 7 mm to about 9 mm.

The number of counterweight blocks in a counterweight fixture may vary. For example, the counterweight fixture 110 of FIG. 3 shows one counterweight block, while the counterweight fixture 10 of FIG. 1 shows two counterweight blocks. It is contemplated that the number of counterweight blocks in a counterweight fixture may vary, but are generally from about 1 to about 5 and, more specifically, from about 1 to about 3.

Referring still to FIG. 1, the base 30 includes a bottom 32 and a plurality of walls 34, 36 extending upwardly from the bottom 32. The plurality of walls 34, 36 extends generally perpendicular or perpendicular from the bottom 32 in this embodiment. The plurality of walls 34, 36 are on opposing sides of the bottom 32, as shown in FIG. 1. An end 34*a* of the wall 34 has a plurality of wall positioning openings 40*a*, 40*b* to assist in securing the counterweight blocks 12, 14 and the base 30. Similarly, an end 36*a* of the wall 36 has a plurality of wall positioning openings 42*a*, 42*b* to assist in securing the counterweight blocks 12, 14 and the base 30. Each of the plurality of wall positioning openings 40*a*, 40*b*, 42*a*, 42*b* corresponds with one of block positioning openings to assist in securing the plurality of counterweight blocks 12, 14 and the base 30.

The wall positioning openings 40*a*, 40*b*, 42*a*, 42*b* are shown in a non-polygonal shape and, more specifically, in the shape of a general circle or circle in FIG. 1. It is contemplated that the wall positioning openings may be formed of other non-polygonal and polygonal shapes.

It is contemplated that the end of the wall may have one wall positioning opening. It is also contemplated that the end of the wall may have a plurality of wall openings.

Figure 2E:
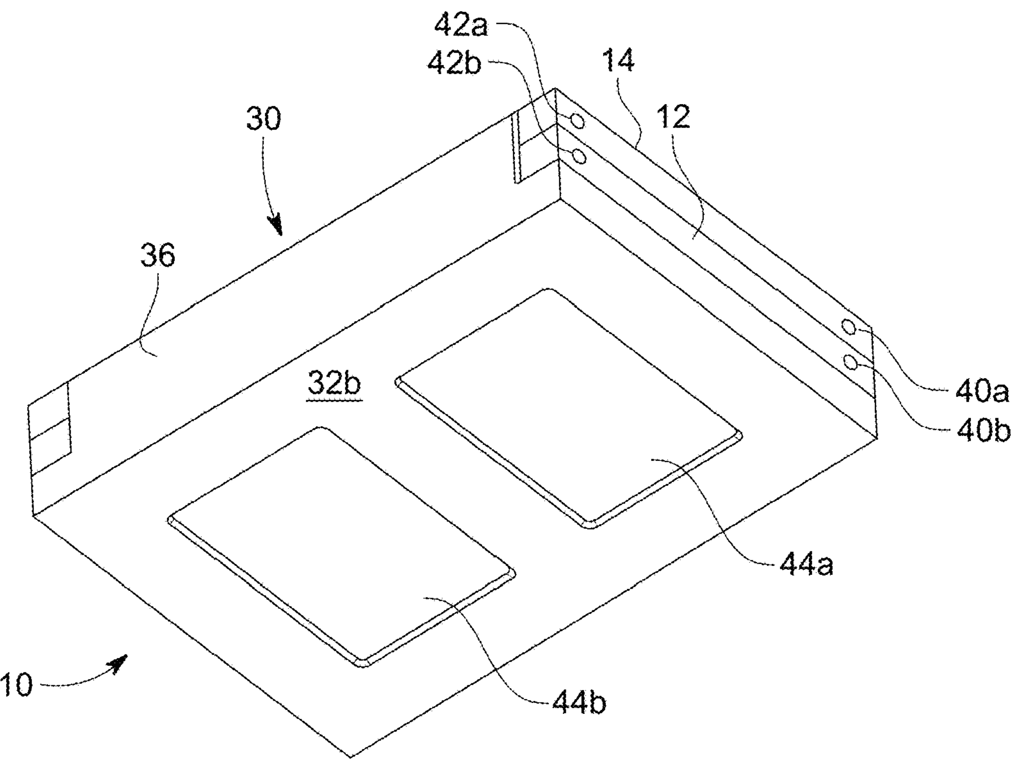
FIG. 2E is a bottom perspective view of the counterweight fixture of FIG. 1 without any magnets.
Figure 2F:
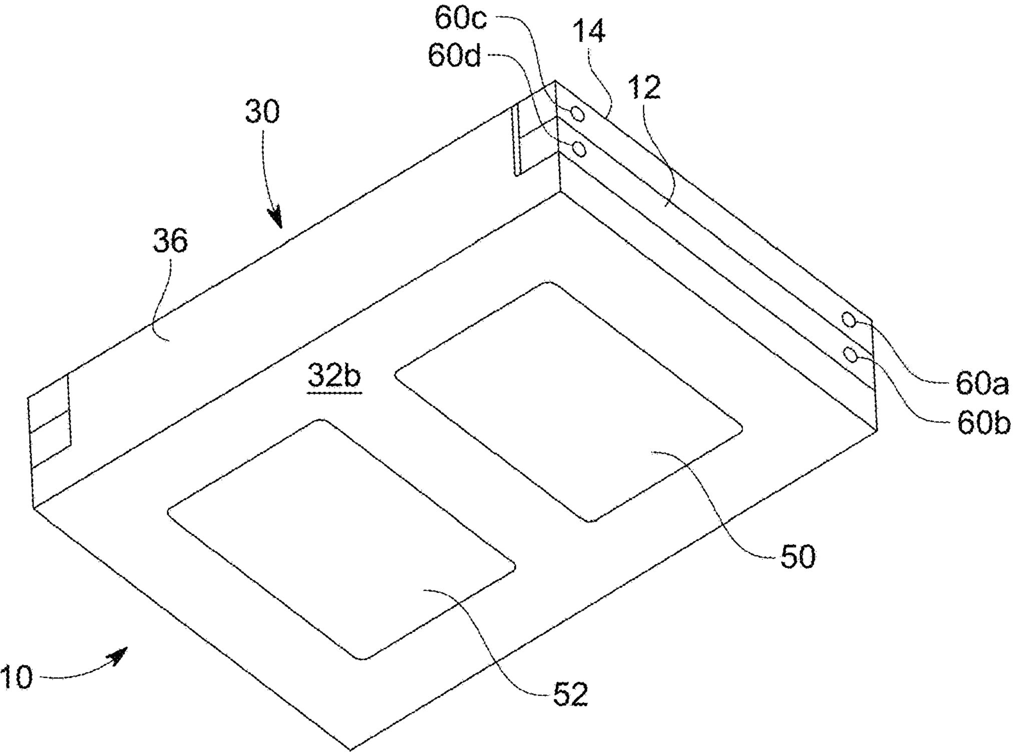
FIG. 2F is a bottom perspective view of the counterweight fixture of FIG. 1 with a plurality of magnets.

As shown in FIG. 1, the bottom 32 includes a first or top surface 32*a* and a second or bottom surface 32*b* (see FIGS. 2E, 2F). The first or top surface 32*a* includes the walls 34, 36. The bottom surface 32*b* of the base 30 of FIG. 2E forms a plurality of openings 44*a*, 44*b*. The plurality of openings 44*a*, 44*b* is sized and shaped to receive a respective one of the magnets 50, 52. The magnets 50, 52 are securely embedded in a respective one of the plurality of openings 44*a*, 44*b*. The magnets may be securely embedded in a respective one of the openings by, for example, an adhesive, press-fit, hook or a screw.

The plurality of openings 44*a*, 44*b* is in a generally polygonal shape (e.g., a rectangle), as shown in FIG. 2E. It is contemplated that the plurality of openings may be of other polygonal or non-polygonal shapes such as, for example, square or circular.

It is contemplated in another embodiment that the base may include at least one wall. For example, it is contemplated that the base may include one wall extending from the bottom to assist in positioning the at least one counterweight block. It is also contemplated that the base may include more than two walls to assist in positioning the at least one counterweight block.

To secure the counterweight blocks 12, 14 and the base 30, the securing elements 60*a*-60*h* of FIG. 1 are used. The securing elements 60*a*-60*h* extend through a respective one of the block positioning openings and a corresponding one of the wall positioning openings to assist in securing the at least one counterweight block and the base. The securing element may be a screw, pin, or plunger. It is contemplated that the securing element may be other components that assist in securing the at least one counterweight block and the base.

The magnets 50, 52 comprise a metallic material according to one embodiment. For example, the magnets may comprise steel (e.g., Neodymium). It is contemplated that the magnets may comprise other metallic materials. The magnets 50, 52 in an assembled state of the counterweight fixture are shown in FIG. 2F.

It is also contemplated that the at least one magnet may be one magnet in another embodiment. The one magnet may be the same or a different shape as the magnets discussed above.

Figure 4:
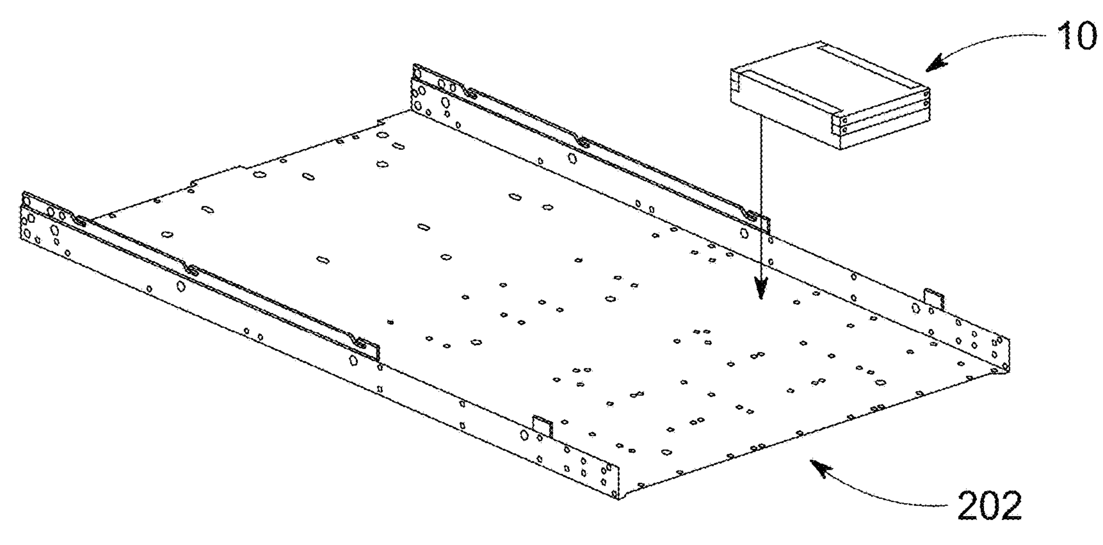
FIG. 4 is a top perspective view of the counterweight fixture of FIG. 1 and a chassis in the process of being fixedly attached thereto, according to one embodiment.

As discussed above, the counterweight fixture is configured to be fixedly attached to a frame, such as, for example, a chassis or a sled. Referring to FIG. 4, the counterweight fixture 10 is shown in the process of being fixedly attached to a frame. More specifically, in this embodiment, the frame is a chassis 202. The chassis 202 comprises metallic material. For example, the chassis may comprise steel (e.g., galvanized sheet). It is contemplated that the chassis may comprise other metallic materials such as cold reduced sheet. The magnets 50, 52 of the counterweight fixture 10 are configured to be fixedly attached to the chassis 202.

Figure 5:
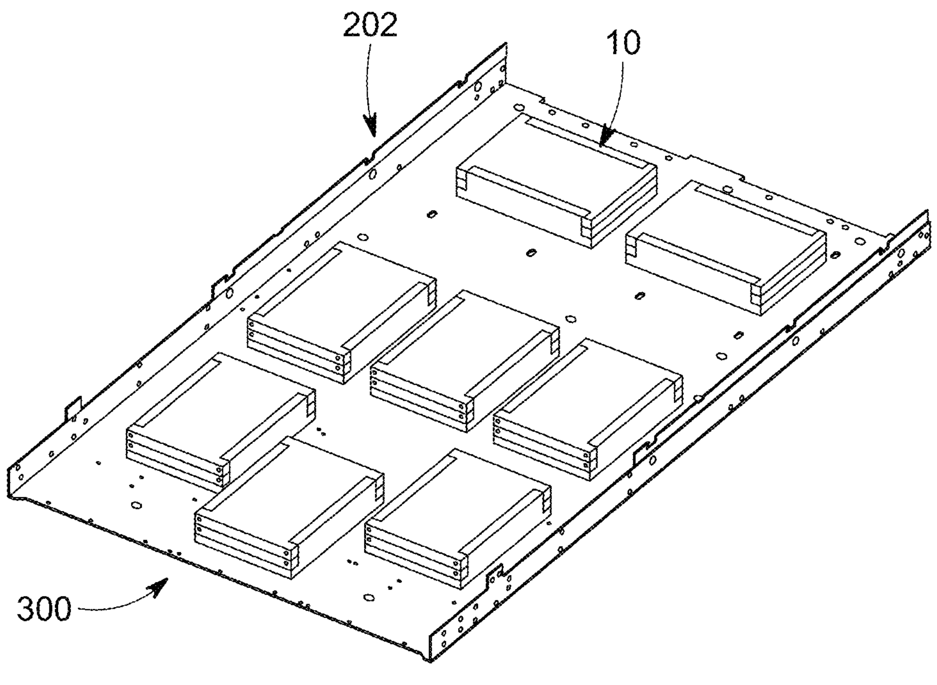
FIG. 5 is a top perspective view of a plurality of counterweight fixtures of FIG. 1 being located and fixedly attached thereto and a chassis, according to one embodiment.
Figure 6:
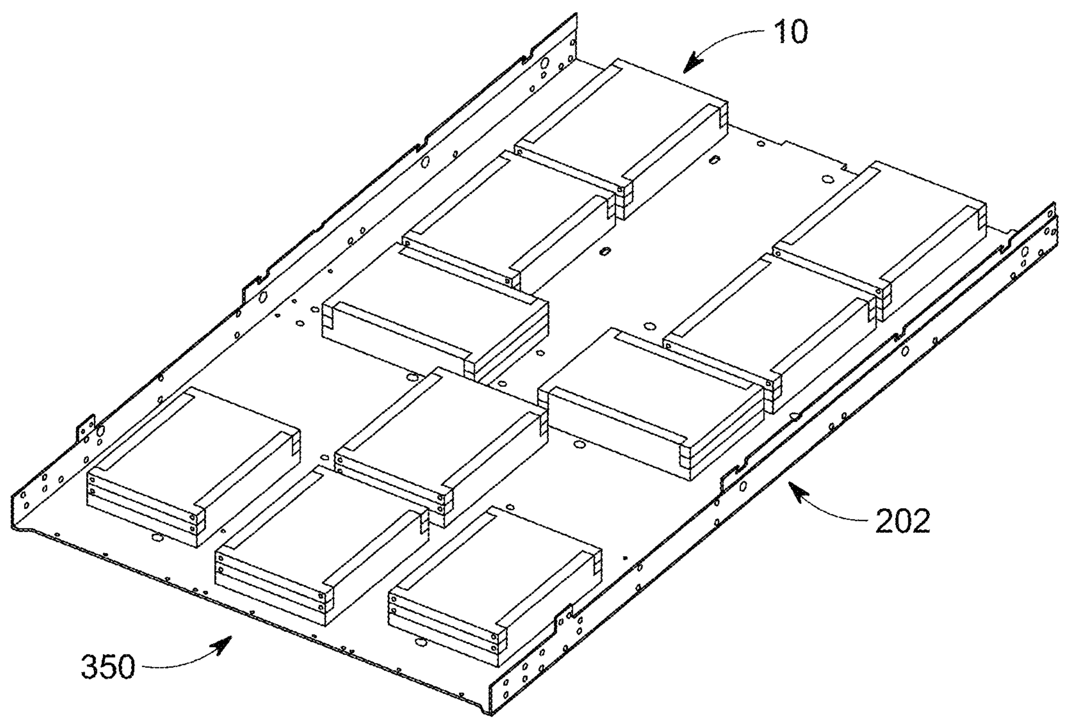
FIG. 6 is a top perspective view of a plurality of counterweight fixtures of FIG. 1 being located and fixedly attached thereto and a chassis, according to another embodiment.

The number of counterweight fixtures may vary as well as the weight and location of the counterweight fixtures. The counterweight fixtures are configured to simulate the computing devices located within a frame. Referring to FIGS. 5 and 6, respective frame assemblies 300, 350 are shown including the chassis 202 and the plurality of counterweight fixtures 10. The frame assembly 300 of FIG. 5 includes exactly eight counterweight fixtures 10, while the frame assembly 350 of FIG. 6 includes ten counterweight fixtures 10.

Figure 7:
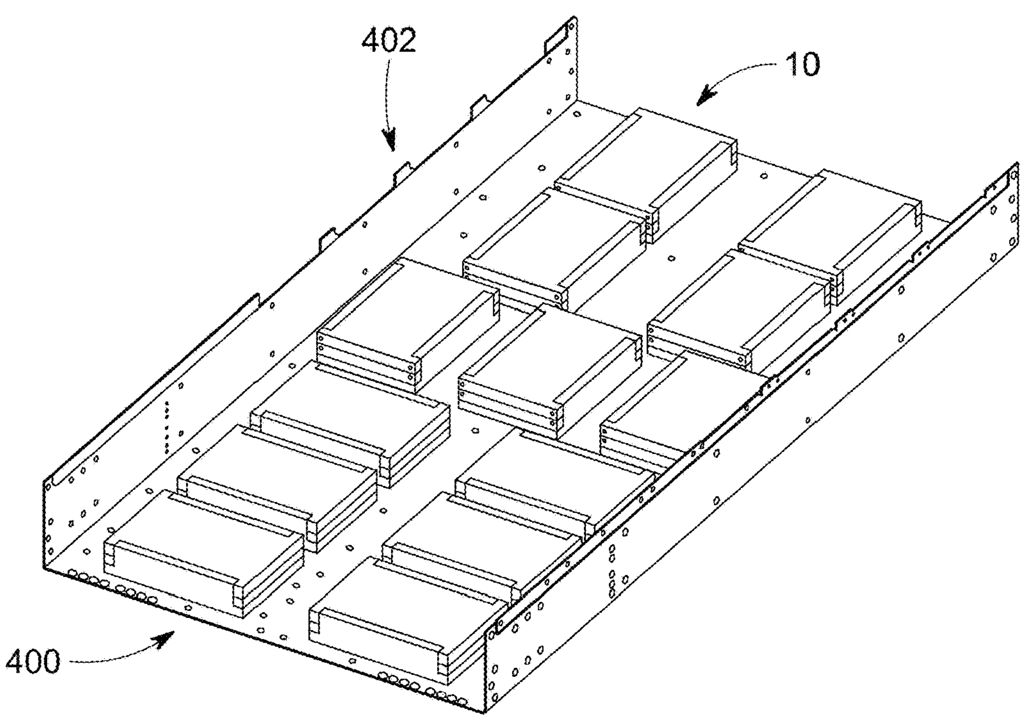
FIG. 7 is a top perspective view of a plurality of counterweight fixtures of FIG. 1 being located and fixedly attached thereto and a chassis, according to a further embodiment.
Figure 8:
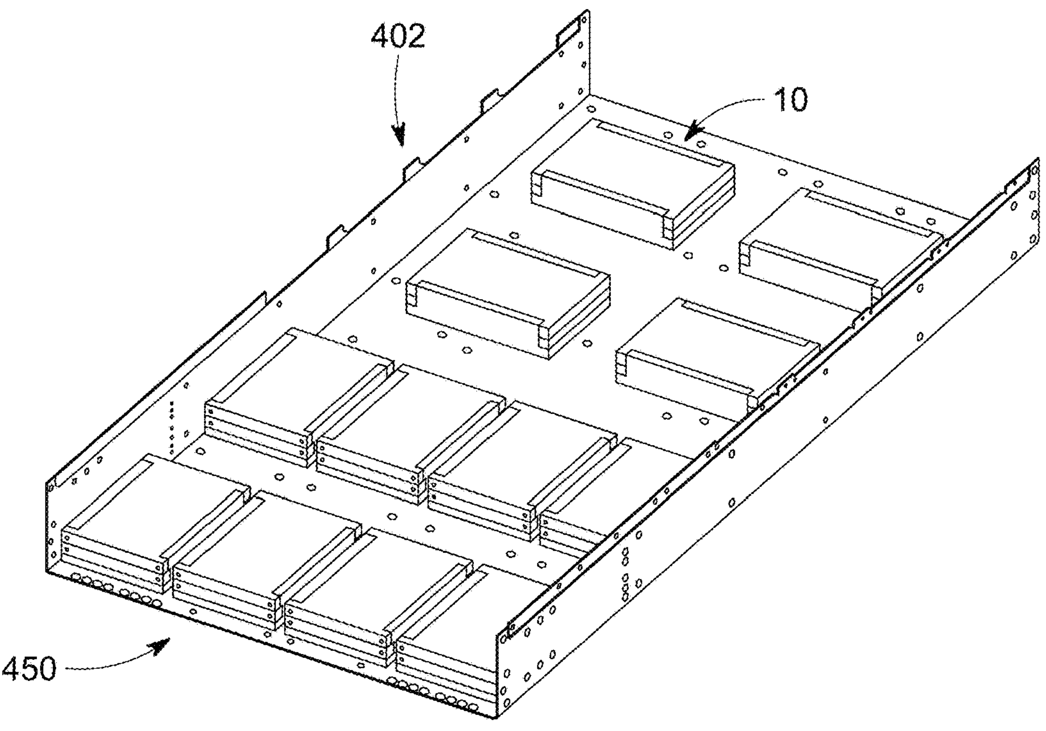
FIG. 8 is a top perspective view of a plurality of counterweight fixtures of FIG. 1 being located and fixedly attached thereto and a chassis, according to yet another embodiment.

Referring to FIGS. 7 and 8, respective frame assemblies 400, 450 are shown including a chassis 402 and the plurality of counterweight fixtures 10. The frame assembly 400 of FIG. 7 includes exactly thirteen counterweight fixtures 10, while the frame assembly 450 of FIG. 6 includes twelve counterweight fixtures 10. These distributions may be that of a 1U, 2U, or 4U server.

Figure 9:
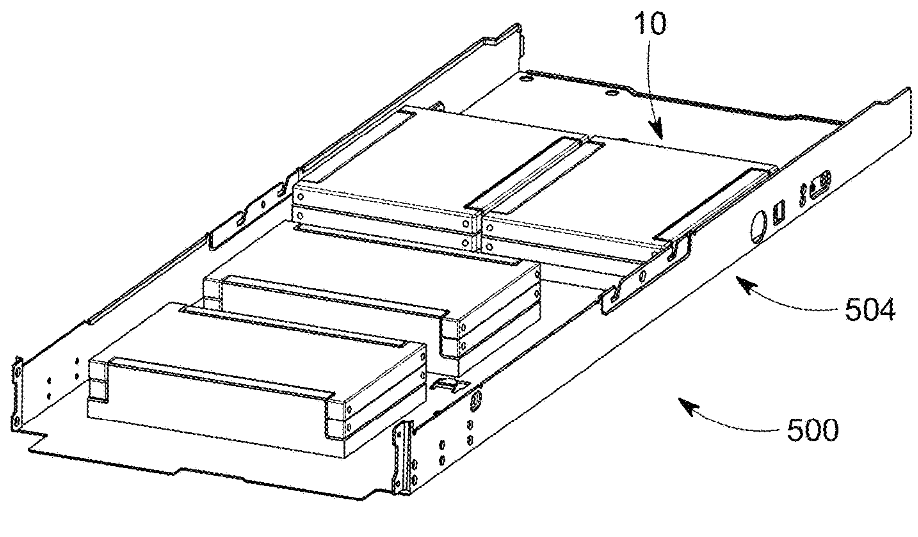
FIG. 9 is a top perspective view of a plurality of counterweight fixtures of FIG. 1 being located and fixedly attached in a sled, according to one embodiment.

In addition to a chassis, the frame may be, for example, a sled. The sled is a physical sliding device configured to store computing devices such as, for example, processors, servers, storage devices, etc. One non-limiting example of a sled used in a frame assembly is shown in FIG. 9. Specifically, FIG. 9 shows a top perspective view of a frame assembly 500, including a sled 504 and the plurality of counterweight fixtures 10. The frame assembly 500 includes four counterweight fixtures. Like the chassis, the sled 504 comprises metallic material. For example, the sled may comprise steel (e.g., stainless steel). It is contemplated that the sled may comprise other metallic materials. The magnets 50, 52 (in FIGS. 1, 2F) of the respective counterweight fixture 10 are fixedly attached to the sled 504.

Figure 10:
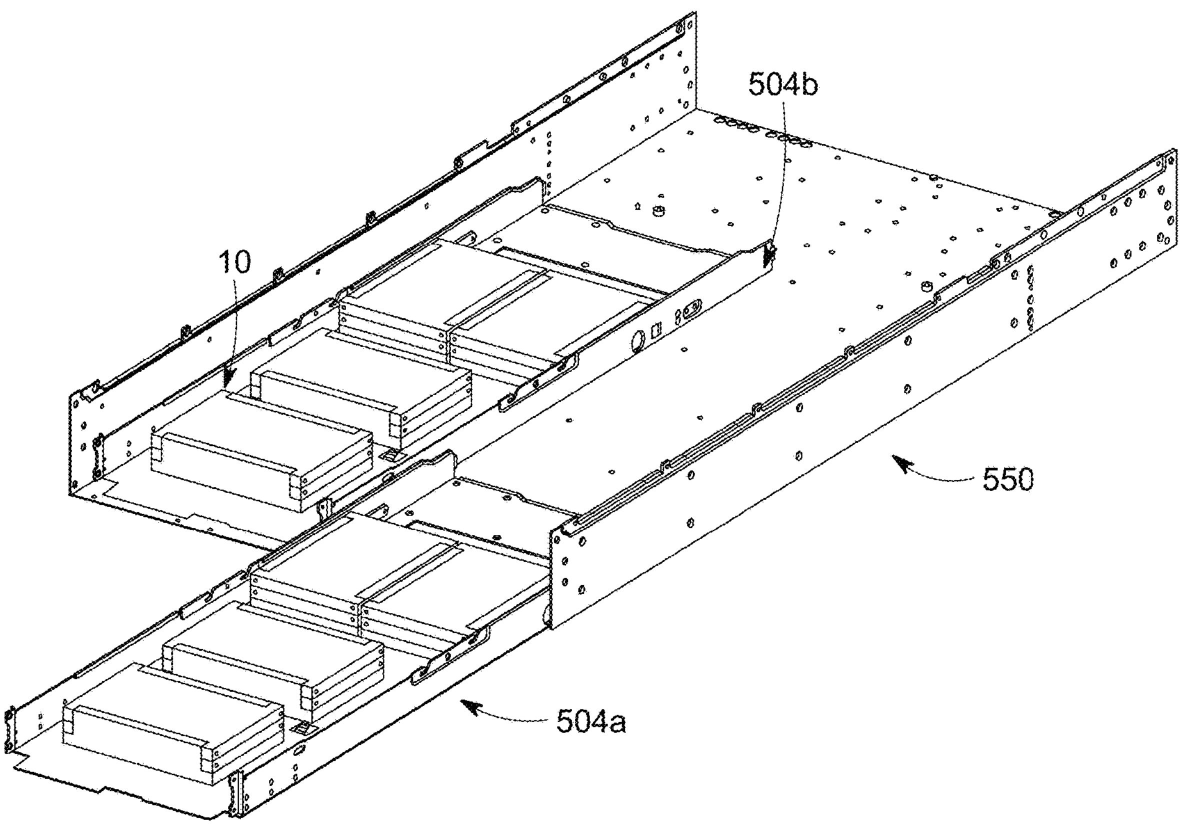
FIG. 10 is a top perspective view of a plurality of counterweight fixtures of FIG. 1 being located and fixedly attached in a plurality of sleds in a chassis, according to one embodiment.

Another non-limiting example of a sled used in a frame assembly is shown in FIG. 10. Specifically, FIG. 10 shows a top perspective view of a frame assembly 550 using sleds 504*a*, 504*b* and the plurality of counterweight fixtures 10. Each of the sleds 504*a*, 504*b* includes four counterweight fixtures. Each of the magnets 50, 52 (in FIGS. 1, 2F) of the respective counterweight fixture 10 is fixedly attached to one of the sleds 504*a*, 504*b*.

A computing device assembly in one embodiment includes a frame (chassis and a plurality of sleds) with computing devices stored therein. The computing devices may be a server in one embodiment. In another embodiment, the computing devices may be a storage device. In a further embodiment, the computing devices may be a processor. The computing device is any device that includes a processor in a further embodiment. The computing device assembly includes power supply unit modules therein.

The counterweight fixtures 10 assist in testing the weight distribution of a computing device assembly. It is contemplated that other computing device assemblies may be tested.

According to one process, weight distribution of a computing device assembly is tested. At least one frame comprising a metallic material is provided. A plurality of counterweight fixtures is provided. Each of the plurality of counterweight fixtures are fixedly attached to one of the at least one frame via the at least one magnet of each of the counterweight fixtures. Testing of the weight distribution of the computing device assembly is performed using the plurality of counterweight fixtures.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. A counterweight fixture for simulating weight of a computing device, the counterweight fixture comprising:

at least one counterweight block, a base, and at least one magnet, the at least one counterweight block being configured to be placed on and secured to the base, the base including a bottom and at least one wall extending from the bottom, the bottom of the base forming at least one opening on an opposite side of the at least one wall, the at least one magnet being securely embedded in a respective one of the at least one opening of the bottom of the base.

2. The counterweight fixture of claim 1, wherein the at least one counterweight block is a plurality of counterweight blocks.

3. The counterweight fixture of claim 1, wherein the at least one counterweight block includes a plurality of extensions to assist in positioning the at least one counterweight block and the base.

4. The counterweight fixture of claim 1, wherein the at least one wall of the base is a plurality of walls, each of the plurality of walls of the base forming at least one wall positioning opening to assist in securing the at least one counterweight block and the base.

5. The counterweight fixture of claim 4, wherein the at least one counterweight block includes a plurality of extensions located at opposing edges to assist in positioning the at least one counterweight block and the base, each of the plurality of extensions forming a respective block positioning opening, each of the block positioning openings corresponding with one of the at least one wall positioning opening to assist in securing the at least one counterweight block and the base.

6. The counterweight fixture of claim 5, further including a securing element extending through one of the block positioning opening and a corresponding one of the at least one wall positioning opening to assist in securing the at least one counterweight block and the base.

7. The counterweight fixture of claim 6, wherein the securing element is a screw, pin, or plunger.

8. The counterweight fixture of claim 1, wherein the at least one magnet is a plurality of magnets.

9. The counterweight fixture of claim 1, wherein the at least one counterweight block is received within a chassis of the computing device.

10. The counterweight fixture of claim 9, wherein the chassis is part of a 1U server or a 2U server.

11. A frame assembly for a computing system, the frame assembly comprising:

a plurality of counterweight fixtures, each of the plurality of counterweight fixtures including at least one counterweight block, a base, and at least one magnet, the at least one counterweight block being configured to be placed on and secured to the base, the base including a bottom and at least one wall extending from the bottom, the bottom of the base forming at least one opening on an opposite side of the at least one wall, the at least one magnet being securely embedded in a respective one of the at least one opening of the bottom of the base; and a frame comprising metallic material, wherein the at least one magnet of each of the plurality of counterweight fixtures is fixedly attached to the frame.

12. The frame assembly of claim 11, wherein the metallic material of the frame comprises steel.

13. The frame assembly of claim 11, wherein the frame is a chassis.

14. The frame assembly of claim 13, wherein the chassis is part of a 1U server or a 2U server.

15. The frame assembly of claim 11, wherein the frame is a sled.

16. A process of testing weight distribution of a computing device assembly, the process comprising:

providing at least one frame comprising a metallic material;

providing a plurality of counterweight fixtures, each of the plurality of counterweight fixtures including at least one counterweight block, a base, and at least one magnet, the at least one counterweight block being configured to be placed on and secured to the base, the base including a bottom and at least one wall extending from the bottom, the bottom of the base forming at least one opening on an opposite side of the at least one wall, the at least one magnet being securely embedded in a respective one of the at least one opening of the bottom of the base;

attaching each of the plurality of counterweight fixtures to one of the at least one frame via the at least one magnet; and performing testing of weight distribution of the computing device assembly using the plurality of counterweight fixtures.

17. The process of claim 16, wherein the computing device assembly including a computing device, the computing device being a server or a storage device.

18. The process of claim 16, wherein the at least one frame includes a chassis.

19. The process of claim 18, wherein the at least one frame further includes at least one sled.

20. The process of claim 16, wherein the at least one frame includes at least one sled.

* * * * *